US011502873B2

(12) United States Patent
Iwata et al.

(10) Patent No.: US 11,502,873 B2
(45) Date of Patent: Nov. 15, 2022

(54) SWITCH DEVICE, VEHICLE-MOUNTED COMMUNICATION DEVICE, VEHICLE-MOUNTED COMMUNICATION SYSTEM, TIME CORRECTION METHOD, AND TIME CORRECTION PROGRAM

(71) Applicants: SUMITOMO ELECTRIC INDUSTRIES, LTD., Osaka (JP); AUTONETWORKS TECHNOLOGIES, LTD., Yokkaichi (JP); SUMITOMO WIRING SYSTEMS, LTD., Yokkaichi (JP)

(72) Inventors: Akihito Iwata, Osaka (JP); Takeshi Hagihara, Yokkaichi (JP); Yasuhiro Yabuuchi, Yokkaichi (JP)

(73) Assignees: SUMITOMO ELECTRIC INDUSTRIES, LTD., Osaka (JP); AUTONETWORKS TECHNOLOGIES, LTD., Mie (JP); SUMITOMO WIRING SYSTEMS, LTD., Mie (JP)

(*) Notice: Subject to any disclaimer, the term of this patent is extended or adjusted under 35 U.S.C. 154(b) by 280 days.

(21) Appl. No.: 16/976,513

(22) PCT Filed: Nov. 22, 2018

(86) PCT No.: PCT/JP2018/043212
§ 371 (c)(1),
(2) Date: Aug. 28, 2020

(87) PCT Pub. No.: WO2019/171669
PCT Pub. Date: Sep. 12, 2019

(65) Prior Publication Data
US 2021/0006435 A1 Jan. 7, 2021

(30) Foreign Application Priority Data
Mar. 7, 2018 (JP) .............................. JP2018-040611

(51) Int. Cl.
H04L 12/46 (2006.01)
H04L 12/40 (2006.01)
B60R 16/023 (2006.01)

(52) U.S. Cl.
CPC ........ *H04L 12/4641* (2013.01); *B60R 16/023* (2013.01); *H04L 12/40* (2013.01); *H04L 2012/40215* (2013.01)

(58) Field of Classification Search
None
See application file for complete search history.

(56) References Cited

U.S. PATENT DOCUMENTS

2012/0039339 A1* 2/2012 Kurita .................... H04L 45/00
370/400
2015/0085852 A1 3/2015 Mizutani et al.
(Continued)

FOREIGN PATENT DOCUMENTS

JP 2013-098788 A 5/2013
JP 2013-168865 A 8/2013
(Continued)

*Primary Examiner* — Angela Nguyen
(74) *Attorney, Agent, or Firm* — Oliff PLC

(57) ABSTRACT

This switch device includes: a relay unit configured to perform a first relay process of relaying data between function units installed in a vehicle and belonging to different VLANs; a calculation unit configured to calculate time correction information on the basis of a transmission time of data from a first function unit serving as the function unit to the switch device, a reception time in the switch device of the data transmitted from the first function unit, a transmission time of data from a second function unit serving as the function unit to the switch device, and a reception time in the switch device of the data transmitted from the second function unit; and a notification unit configured to notify the second function unit of the time correction information calculated by the calculation unit.

10 Claims, 10 Drawing Sheets

(56) References Cited

U.S. PATENT DOCUMENTS

2016/0173530 A1    6/2016  Miyake
2017/0244477 A1*  8/2017  Seo .......................... H04L 12/40
2021/0152266 A1*  5/2021  Sakaue ................. H04J 3/0641

FOREIGN PATENT DOCUMENTS

| JP | 2015-065525 A | 4/2015 |
|----|---------------|--------|
| JP | 2017-123570 A | 7/2017 |
| WO | 2014/167703 A1 | 10/2014 |

* cited by examiner

FIG. 3

| PORT NUMBER | MAC ADDRESS |
|---|---|
| 1 | MAC-A |
| 2 | MAC-B |
| 3 | MAC-C |
| 4 | MAC-D |

| VID | DEVICE | MAC ADDRESS | IP ADDRESS |
|---|---|---|---|
| 2 | FUNCTION UNIT 111C | MAC-C | IP-C |
| 2 | FUNCTION UNIT 111D | MAC-D | IP-D |

Ta2B

SWITCH DEVICE, VEHICLE-MOUNTED COMMUNICATION DEVICE, VEHICLE-MOUNTED COMMUNICATION SYSTEM, TIME CORRECTION METHOD, AND TIME CORRECTION PROGRAM

TECHNICAL FIELD

The present invention relates to a switch device, an on-vehicle communication device, an on-vehicle communication system, a time correction method, and a time correction program.

This application claims priority on Japanese Patent Application No. 2018-40611 filed on Mar. 7, 2018, the entire content of which is incorporated herein by reference.

BACKGROUND ART

PATENT LITERATURE 1 (Japanese Laid-Open Patent Publication No. 2013-168865) discloses an on-vehicle network system as follows. That is, the on-vehicle network system includes: an on-vehicle control device having a memory that stores therein definition data defining a part, of a communication protocol used in an on-vehicle network, which depends on implementation on the on-vehicle network; and a communication protocol issuing device that issues the definition data to the on-vehicle control device. When the communication protocol issuing device receives, from a registration device that allows the on-vehicle control device to participate in the on-vehicle network, a registration request that requests participation of the on-vehicle control device in the on-vehicle network, the communication protocol issuing device performs authentication for the registration device, creates the definition data based on implementation on the on-vehicle network, and returns the definition data to the registration device. The registration device receives the definition data transmitted from the communication protocol issuing device, and requests the on-vehicle control device to store the received definition data in the memory. Then, the on-vehicle control device receives the definition data from the registration device, stores the definition data in the memory, and performs communication by using the on-vehicle network, based on the part, of the communication protocol, defined by the definition data.

CITATION LIST

Patent Literature

PATENT LITERATURE 1: Japanese Laid-Open Patent Publication No. 2013-168865

SUMMARY OF INVENTION (1) A switch device of the present disclosure includes: a relay unit configured to perform a first relay process of relaying data between function units installed in a vehicle and belonging to different VLANs (Virtual Local Area Networks); a calculation unit configured to calculate time correction information on the basis of a transmission time of data from a first function unit serving as the function unit to the switch device, a reception time in the switch device of the data transmitted from the first function unit, a transmission time of data from a second function unit serving as the function unit to the switch device, and a reception time in the switch device of the data transmitted from the second function unit; and a notification unit configured to notify the second function unit of the time correction information calculated by the calculation unit.

(6) An on-vehicle communication device of the present disclosure is installed in a vehicle. The on-vehicle communication device includes: an acquisition unit configured to acquire, from a switch device configured to perform a first relay process of relaying data between the on-vehicle communication devices belonging to different VLANs, time correction information calculated on the basis of a transmission time of data from a first on-vehicle communication device serving as the on-vehicle communication device to the switch device, a reception time in the switch device of the data transmitted from the first on-vehicle communication device, a transmission time of data from a second on-vehicle communication device serving as the on-vehicle communication device to the switch device, and a reception time in the switch device of the data transmitted from the second on-vehicle communication device; and a correction unit configured to correct time of the on-vehicle communication device to which the correction unit belongs, on the basis of the time correction information acquired by the acquisition unit.

(7) An on-vehicle communication system of the present disclosure includes: a switch device configured to perform a first relay process of relaying data between on-vehicle communication devices installed in a vehicle and belonging to different VLANs; and the on-vehicle communication devices. The switch device calculates time correction information on the basis of a transmission time of data from a first on-vehicle communication device serving as the on-vehicle communication device to the switch device, a reception time in the switch device of the data transmitted from the first on-vehicle communication device, a transmission time of data from a second on-vehicle communication device serving as the on-vehicle communication device to the switch device, and a reception time in the switch device of the data transmitted from the second on-vehicle communication device, and the switch device transmits the calculated time correction information to the second on-vehicle communication device. The second on-vehicle communication device receives the time correction information transmitted from the switch device, and corrects time of the second on-vehicle communication device, on the basis of the received time correction information.

(8) A time correction method of the present disclosure is to be performed in a switch device configured to relay data between function units installed in a vehicle and belonging to different VLANs. The time correction method includes the steps of: calculating time correction information on the basis of a transmission time of data from a first function unit serving as the function unit to the switch device, a reception time in the switch device of the data transmitted from the first function unit, a transmission time of data from a second function unit serving as the function unit to the switch device, and a reception time in the switch device of the data transmitted from the second function unit; and notifying the second function unit of the calculated time correction information.

(9) A time correction method of the present disclosure is to be performed in an on-vehicle communication device installed in a vehicle. The time correction method includes the steps of: acquiring, from a switch device configured to perform a first relay process of relaying data between the on-vehicle communication devices belonging to different VLANs, time correction information calculated on the basis of a transmission time of data from a first on-vehicle communication device serving as the on-vehicle communication device to the switch device, a reception time in the switch device of the data transmitted from the first on-vehicle communication device, a transmission time of data from a second on-vehicle communication device serving as the on-vehicle communication device to the switch device, and a reception time in the switch device of the data transmitted from the second on-vehicle communication device; and correcting time of the on-vehicle communication device on the basis of the acquired time correction information.

(10) A time correction method of the present disclosure is to be performed in an on-vehicle communication system. The on-vehicle communication system includes a switch device configured to perform a first relay process of relaying data between on-vehicle communication devices installed in a vehicle and belonging to different VLANs, and the on-vehicle communication devices. The time correction method includes the steps of: calculating, performed by the switch device, time correction information on the basis of a transmission time of data from a first on-vehicle communication device serving as the on-vehicle communication device to the switch device, a reception time in the switch device of the data transmitted from the first on-vehicle communication device, a transmission time of data from a second on-vehicle communication device serving as the on-vehicle communication device to the switch device, and a reception time in the switch device of the data transmitted from the second on-vehicle communication device; transmitting, performed by the switch device, the calculated time correction information to the second on-vehicle communication device; and receiving, performed by the second on-vehicle communication device, the time correction information transmitted from the switch device and correcting, performed by the second on-vehicle communication device, time of the second on-vehicle communication device on the basis of the received time correction information.

(11) A time correction program of the present disclosure is to be used in a switch device. The time correction program causes a computer to function as: a relay unit configured to perform a first relay process of relaying data between function units installed in a vehicle and belonging to different VLANs (Virtual Local Area Networks); a calculation unit configured to calculate time correction information on the basis of a transmission time of data from a first function unit serving as the function unit to the switch device, a reception time in the switch device of the data transmitted from the first function unit, a transmission time of data from a second function unit serving as the function unit to the switch device, and a reception time in the switch device of the data transmitted from the second function unit; and a notification unit configured to notify the second function unit of the time correction information calculated by the calculation unit.

(12) A time correction program of the present disclosure is to be used in an on-vehicle communication device. The time correction program causes a computer to function as: an acquisition unit configured to acquire, from a switch device configured to perform a first relay process of relaying data between the on-vehicle communication devices belonging to different VLANs, time correction information calculated on the basis of a transmission time of data from a first on-vehicle communication device serving as the on-vehicle communication device to the switch device, a reception time in the switch device of the data transmitted from the first on-vehicle communication device, a transmission time of data from a second on-vehicle communication device serving as the on-vehicle communication device to the switch device, and a reception time in the switch device of the data transmitted from the second on-vehicle communication device; and a correction unit configured to correct time of the on-vehicle communication device to which the correction unit belongs, on the basis of the time correction information acquired by the acquisition unit.

One mode of the present disclosure is not only realized as a switch device including such a characteristic processing unit but also as a semiconductor integrated circuit that realizes a part or the entirety of the switch device.

One mode of the present disclosure can be realized not only as an on-vehicle communication device including such a characteristic processing unit but also as a semiconductor integrated circuit that realizes a part or the entirety of the on-vehicle communication device.

One mode of the present disclosure can be realized not only as an on-vehicle communication system including such a characteristic processing unit, but also as a program for causing a computer to execute such a characteristic process, and a semiconductor integrated circuit that realizes a part or the entirety of the on-vehicle communication system.

BRIEF DESCRIPTION OF DRAWINGS

FIG. 3 shows an example of an address table to be used in the switch device according to the embodiment of the present disclosure.

FIG. 5 shows an example of an ARP table Ta2B to be used in the switch device according to the embodiment of the present disclosure.

DESCRIPTION OF EMBODIMENTS

Figure 1:
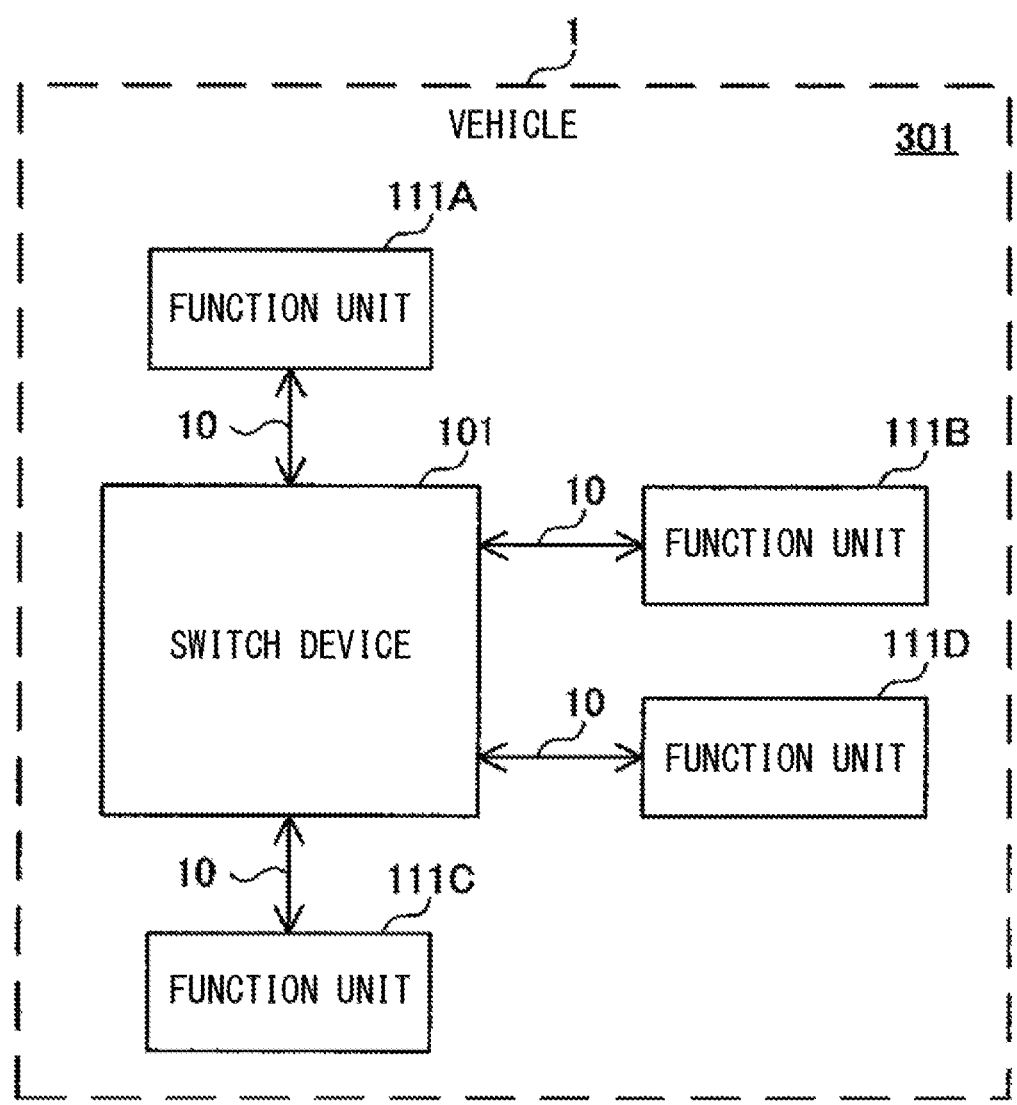
FIG. 1 shows a configuration of an on-vehicle communication system according to an embodiment of the present disclosure.

To date, on-vehicle network systems for improving security in on-vehicle networks have been developed.

Problems to be Solved by the Present Disclosure

For example, when Ethernet (registered trademark) connection is adopted in an on-vehicle network, usually, network configuration information regarding an IP (Internet Protocol) address, a MAC (Medium Access Control) address, and the like is created in each device, and each device performs communication with another device by using the network configuration information.

Meanwhile, as a technology for performing time synchronization between devices connected via Ethernet cables, gPTP (generalized Precision Time Protocol) is known.

However, gPTP is a protocol for performing time synchronization between devices by using the MAC address of each device belonging to the same VLAN (Virtual Local Area Network), and cannot perform time synchronization between devices belonging to different VLANs, from the viewpoint of security.

The present disclosure has been made in order to solve the above problem. An object of the present disclosure is to provide a switch device, an on-vehicle communication device, an on-vehicle communication system, a time correction method, and a time correction program that can realize time synchronization between on-vehicle communication devices belonging to different VLANs.

Effects of the Present Disclosure

According to the present disclosure, time synchronization between on-vehicle communication devices belonging to different VLANs can be realized.

DESCRIPTION OF EMBODIMENTS OF THE PRESENT DISCLOSURE

First, contents of embodiments of the present disclosure are listed and described.

(1) A switch device according to an embodiment the present disclosure includes: a relay unit configured to perform a first relay process of relaying data between function units installed in a vehicle and belonging to different VLANs (Virtual Local Area Networks); a calculation unit configured to calculate time correction information on the basis of a transmission time of data from a first function unit serving as the function unit to the switch device, a reception time in the switch device of the data transmitted from the first function unit, a transmission time of data from a second function unit serving as the function unit to the switch device, and a reception time in the switch device of the data transmitted from the second function unit; and a notification unit configured to notify the second function unit of the time correction information calculated by the calculation unit.

With this configuration, for example, the switch device can calculate the difference between the time of the first function unit and the time of the switch device and the difference between the time of the second function unit and the time of the switch device, and can calculate, as the time correction information, the difference between the time of the first function unit and the time of the second function unit. Accordingly, the second function unit can establish time synchronization with the first function unit by using the notified time correction information. Therefore, time synchronization between function units belonging to different VLANs can be realized.

(2) Preferably, the calculation unit calculates the time correction information further on the basis of a propagation delay time of data between the first function unit and the switch device and a propagation delay time of data between the second function unit and the switch device.

With this configuration, for example, the difference between the time of the first function unit and the time of the switch device, and the difference between the time of the second function unit and the time of the switch device can be more accurately calculated. Thus, the time correction information can be more accurately calculated.

(3) Preferably, the function unit performs time synchronization with another function unit installed in the vehicle and belonging to the same VLAN as that of the function unit, by using a propagation delay time of data between the function unit and the other function unit, and the notification unit causes the time correction information to be included in a response message to a message transmitted from the second function unit for calculating the propagation delay time, and transmits the response message to the second function unit.

With this configuration, the second function unit can acquire the propagation delay time and the time correction information on the basis of the response message received from the switch device. Thus, the second function unit can establish time synchronization with another function unit belonging to the same VLAN as that of the second function unit, by using the propagation delay time and the time correction information that have been acquired.

(4) Preferably, the function unit performs time synchronization with another function unit installed in the vehicle and belonging to the same VLAN as that of the function unit, by causing a message to include a propagation delay time of data between the function unit and the other function unit and transmitting the message, and the calculation unit calculates the time correction information by using a transmission time and a reception time of the message.

Since the time correction information is calculated by using the message transmitted between the function units belonging to the same VLAN, the time correction information can be periodically or non-periodically updated, for example. Therefore, time synchronization using more accurate time correction information can be performed.

(5) Preferably, the relay unit performs a second relay process of relaying data between function units installed in the vehicle and belonging to the same VLAN. The calculation unit creates second time correction information based on: propagation delay times of data between a third function unit and a fourth function unit serving as the function units belonging to the same VLAN, and the switch device; and a retention time of the data in the switch device. The notification unit notifies the fourth function unit of the second time correction information created by the calculation unit.

With this configuration, the fourth function unit can establish time synchronization with the third function unit by using the difference between the time of the third function unit and the time of the switch device, the difference between the time of the fourth function unit and the time of the switch device, and the retention time of data in the switch device.

(6) An on-vehicle communication device according to the embodiment of the present disclosure is installed in a vehicle. The on-vehicle communication device includes: an acquisition unit configured to acquire, from a switch device configured to perform a first relay process of relaying data between the on-vehicle communication devices belonging to different VLANs, time correction information calculated on the basis of a transmission time of data from a first on-vehicle communication device serving as the on-vehicle communication device to the switch device, a reception time in the switch device of the data transmitted from the first on-vehicle communication device, a transmission time of data from a second on-vehicle communication device serving as the on-vehicle communication device to the switch device, and a reception time in the switch device of the data transmitted from the second on-vehicle communication device; and a correction unit configured to correct time of the on-vehicle communication device to which the correction unit belongs, on the basis of the time correction information acquired by the acquisition unit.

With this configuration, for example, the on-vehicle communication device can establish time synchronization with another on-vehicle communication device belonging to a VLAN different from that of the on-vehicle communication device, by using the difference between the time of the on-vehicle communication device and the time of the other on-vehicle communication device. Therefore, time synchronization between on-vehicle communication devices belonging to different VLANs can be realized.

(7) An on-vehicle communication system according to the embodiment of the present disclosure includes: a switch device configured to perform a first relay process of relaying data between on-vehicle communication devices installed in a vehicle and belonging to different VLANs; and the on-vehicle communication devices. The switch device calculates time correction information on the basis of a transmission time of data from a first on-vehicle communication device serving as the on-vehicle communication device to the switch device, a reception time in the switch device of the data transmitted from the first on-vehicle communication device, a transmission time of data from a second on-vehicle communication device serving as the on-vehicle communication device to the switch device, and a reception time in the switch device of the data transmitted from the second on-vehicle communication device, and the switch device transmits the calculated time correction information to the second on-vehicle communication device. The second on-vehicle communication device receives the time correction information transmitted from the switch device, and corrects time of the second on-vehicle communication device, on the basis of the received time correction information.

With this configuration, for example, the switch device can calculate the difference between the time of the first on-vehicle communication device and the time of the switch device, and the difference between the time of the second on-vehicle communication device and the time of the switch device, and can calculate, as the time correction information, the difference between the time of the first on-vehicle communication device and the time of the second on-vehicle communication device. Accordingly, the second on-vehicle communication device can establish time synchronization with the first on-vehicle communication device by using the notified time correction information. Therefore, time synchronization between on-vehicle communication devices belonging to different VLANs can be realized.

(8) A time correction method according to the embodiment of the present disclosure is to be performed in a switch device configured to relay data between function units installed in a vehicle and belonging to different VLANs. The time correction method includes the steps of: calculating time correction information on the basis of a transmission time of data from a first function unit serving as the function unit to the switch device, a reception time in the switch device of the data transmitted from the first function unit, a transmission time of data from a second function unit serving as the function unit to the switch device, and a reception time in the switch device of the data transmitted from the second function unit; and notifying the second function unit of the calculated time correction information.

With this method, for example, the switch device can calculate the difference between the time of the first function unit and the time of the switch device, and the difference between the time of the second function unit and the time of the switch device, and can calculate, as the time correction information, the difference between the time of the first function unit and the time of the second function unit. Accordingly, the second function unit can establish time synchronization with the first function unit by using the notified time correction information. Therefore, time synchronization between function units belonging to different VLANs can be realized.

(9) A time correction method according to the embodiment of the present disclosure is to be performed in an on-vehicle communication device installed in a vehicle. The time correction method includes the steps of: acquiring, from a switch device configured to perform a first relay process of relaying data between the on-vehicle communication devices belonging to different VLANs, time correction information calculated on the basis of a transmission time of data from a first on-vehicle communication device serving as the on-vehicle communication device to the switch device, a reception time in the switch device of the data transmitted from the first on-vehicle communication device, a transmission time of data from a second on-vehicle communication device serving as the on-vehicle communication device to the switch device, and a reception time in the switch device of the data transmitted from the second on-vehicle communication device; and correcting time of the on-vehicle communication device on the basis of the acquired time correction information.

With this method, the on-vehicle communication device can establish time synchronization with another on-vehicle communication device belonging to a VLAN different from that of the on-vehicle communication device, by using the difference between the time of the on-vehicle communication device and the time of the other on-vehicle communication device. Therefore, time synchronization between on-vehicle communication devices belonging to different VLANs can be realized.

(10) A time correction method according to the embodiment of the present disclosure is to be performed in an on-vehicle communication system. The on-vehicle communication system includes a switch device configured to perform a first relay process of relaying data between on-vehicle communication devices installed in a vehicle and belonging to different VLANs, and the on-vehicle communication devices. The time correction method includes the steps of: calculating, performed by the switch device, time correction information on the basis of a transmission time of data from a first on-vehicle communication device serving as the on-vehicle communication device to the switch device, a reception time in the switch device of the data transmitted from the first on-vehicle communication device, a transmission time of data from a second on-vehicle communication device serving as the on-vehicle communication device to the switch device, and a reception time in the switch device of the data transmitted from the second on-vehicle communication device; transmitting, performed by the switch device, the calculated time correction information to the second on-vehicle communication device; and receiving, performed by the second on-vehicle communication device, the time correction information transmitted from the switch device and correcting, performed by the second on-vehicle communication device, time of the second on-vehicle communication device on the basis of the received time correction information.

With this method, for example, the switch device can calculate the difference between the time of the first on-vehicle communication device and the time of the switch device, and the difference between the time of the second on-vehicle communication device and the time of the switch device, and can calculate, as the time correction information, the difference between the time of the first on-vehicle communication device and the time of the second on-vehicle communication device. Accordingly, the second on-vehicle communication device can establish time synchronization with the first on-vehicle communication device by using the notified time correction information. Therefore, time synchronization between on-vehicle communication devices belonging to different VLANs can be realized.

(11) A time correction program according to the embodiment of the present disclosure is to be used in a switch device. The time correction program causes a computer to function as: a relay unit configured to perform a first relay process of relaying data between function units installed in a vehicle and belonging to different VLANs; a calculation unit configured to calculate time correction information on the basis of a transmission time of data from a first function unit serving as the function unit to the switch device, a reception time in the switch device of the data transmitted from the first function unit, a transmission time of data from a second function unit serving as the function unit to the switch device, and a reception time in the switch device of the data transmitted from the second function unit; and a notification unit configured to notify the second function unit of the time correction information calculated by the calculation unit.

With this configuration, for example, the switch device can calculate the difference between the time of the first function unit and the time of the switch device, and the difference between the time of the second function unit and the time of the switch device, and can calculate, as the time correction information, the difference between the time of the first function unit and the time of the second function unit. Accordingly, the second function unit can establish time synchronization with the first function unit by using the notified time correction information. Therefore, time synchronization between function units belonging to different VLANs can be realized.

(12) A time correction program according to the embodiment of the present disclosure is to be used in an on-vehicle communication device. The time correction program causes a computer to function as: an acquisition unit configured to acquire, from a switch device configured to perform a first relay process of relaying data between the on-vehicle communication devices belonging to different VLANs, time correction information calculated on the basis of a transmission time of data from a first on-vehicle communication device serving as the on-vehicle communication device to the switch device, a reception time in the switch device of the data transmitted from the first on-vehicle communication device, a transmission time of data from a second on-vehicle communication device serving as the on-vehicle communication device to the switch device, and a reception time in the switch device of the data transmitted from the second on-vehicle communication device; and a correction unit configured to correct time of the on-vehicle communication device to which the correction unit belongs, on the basis of the time correction information acquired by the acquisition unit.

With this configuration, the on-vehicle communication device can establish time synchronization with another on-vehicle communication device belonging to a VLAN different from that of the on-vehicle communication device, by using the difference between the time of the on-vehicle communication device and the time of the other on-vehicle communication device. Therefore, time synchronization between on-vehicle communication devices belonging to different VLANs can be realized.

Hereinafter, embodiments of the present disclosure will be described with reference to the drawings. In the drawings, the same or corresponding parts are denoted by the same reference signs, and the descriptions thereof are not repeated. At least some parts of the embodiments described below can be combined together as desired.

<Configuration and Basic Operation>

[On-Vehicle Communication System]

FIG. 1 shows a configuration of an on-vehicle communication system according to an embodiment of the present disclosure.

With reference to FIG. 1, an on-vehicle communication system 301 is installed in a vehicle 1, and includes a switch device 101, and a plurality of function units (on-vehicle communication devices) 111. FIG. 1 shows an example case in which four function units 111A, 111B, 111C, 111D are provided. The function unit 111 is an ECU (Electronic Control unit), for example.

The switch device 101 is connected to a plurality of function units 111 through Ethernet (registered trademark) cables 10, for example, and can perform communication with the plurality of function units 111 connected to the switch device 101. The connection relationship between the switch device 101 and the function units 111 is fixed, for example.

Specifically, the switch device 101 performs a relay process of relaying data from a function unit 111 to another function unit 111. Information is communicated between the switch device 101 and the function unit 111 by using an Ethernet frame storing an IP packet therein, for example.

The function unit 111 is an extra-vehicular communication ECU, a sensor, a camera, a navigation device, an automated driving processing ECU, an engine control device, an AT (Automatic Transmission) control device, an HEV (Hybrid Electric Vehicle) control device, a brake control device, a chassis control device, a steering control device, an instrument indication control device, or the like.

In this example, the function unit 111A and the function unit 111B belong to a first VLAN (Virtual Local Area Network). The function unit 111C and the function unit 111D belong to a second VLAN.

The ID (hereinafter, also referred to as "VID") of the first VLAN is "1", and the VID of the second VLAN is "2".

The switch device 101 and the function unit 111 each have a unique MAC (Media Access Control) address, for example. The switch device 101 and the function unit 111 are fixedly provided with individual IP (Internet Protocol) addresses, for example.

[Switch Device]

Figure 2:
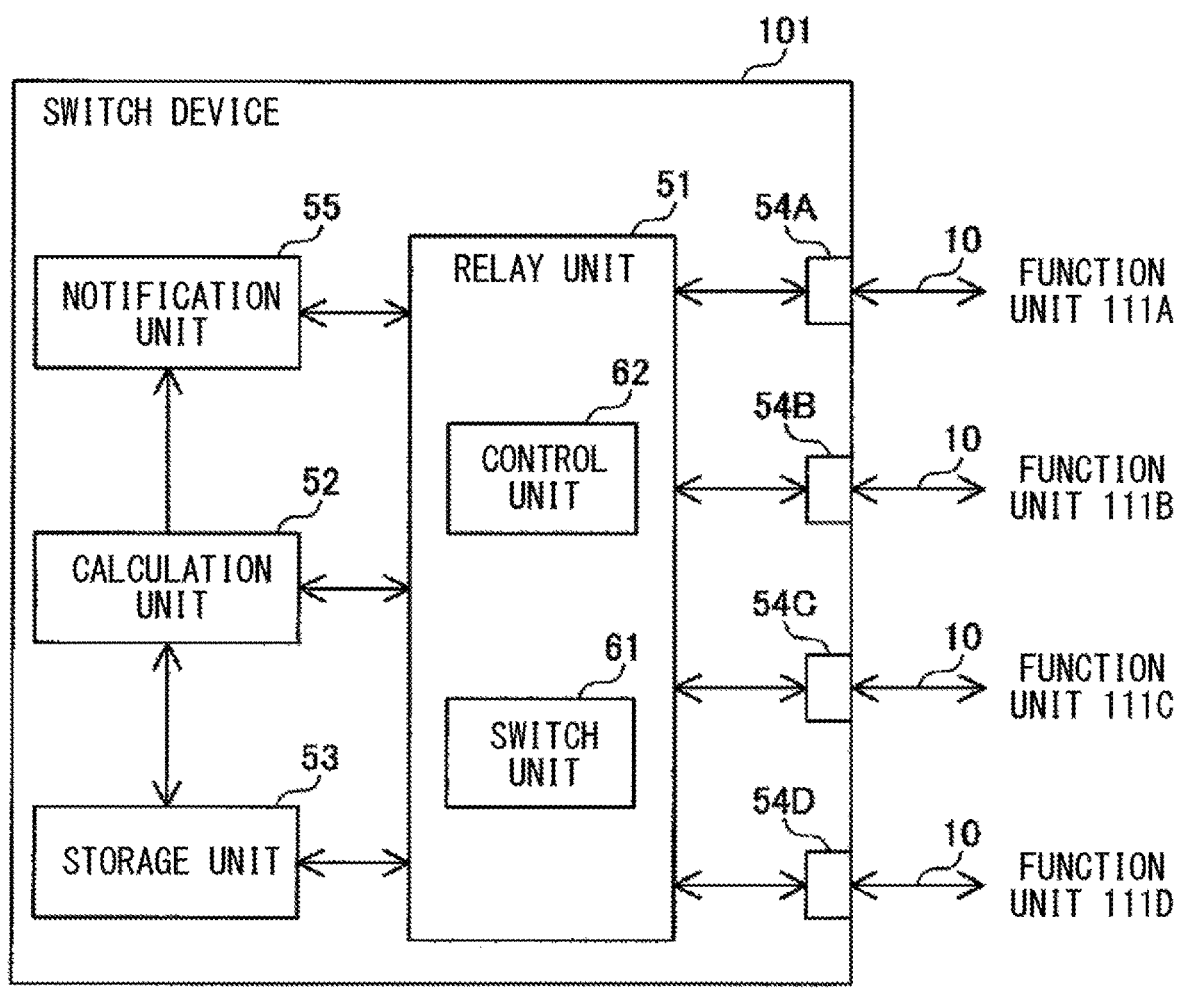
FIG. 2 shows a configuration of a switch device according to the embodiment of the present disclosure.

FIG. 2 shows a configuration of the switch device according to the embodiment of the present disclosure.

With reference to FIG. 2, the switch device 101 includes a relay unit 51, a calculation unit 52, a storage unit 53, a plurality of communication ports 54, and a notification unit 55. The relay unit 51 includes a switch unit 61 and a control unit 62.

(Relay Process)

Each communication port 54 is a terminal to which an Ethernet cable 10 can be connected, for example. The communication port 54 may be a terminal of an integrated circuit. Each of the plurality of communication ports 54 is connected to any one of the plurality of function units 111 via an Ethernet cable 10. In this example, a communication port 54A is connected to the function unit 111A, a communication port 54B is connected to the function unit 111B, a communication port 54C is connected to the function unit 111C, and a communication port 54D is connected to the function unit 111D.

The switch unit 61 operates according to a communication protocol having a plurality of layers. More specifically, the switch unit 61 can function as an L2 (layer 2) switch, and performs a relay process (second relay process) of relaying an Ethernet frame transmitted between function units 111 belonging to the same VLAN.

That is, the switch unit 61 relays data between function units 111 belonging to the same VLAN, by using an address table Ta1. The address table Ta1 indicates a correspondence relationship between the port number of each communication port 54 and the MAC address of a connection destination device.

The switch unit 61 can also function as an L3 (layer 3) relay device, and performs a relay process (first relay process) of relaying an Ethernet frame between function units 111 belonging to different VLANs.

More specifically, the switch unit 61 relays data between function units 111 belonging to different VLANs, by using the address table Ta1 and ARP (Address Resolution Protocol) tables Ta2A, Ta2B for the respective VLANs.

The ARP table Ta2A indicates a correspondence relationship between the MAC address and the IP (Internet Protocol) address of each function unit 111 belonging to the first VLAN. The ARP table Ta2B indicates a correspondence relationship between the MAC address and the IP address of each function unit 111 belonging to the second VLAN. The address table Ta1, the ARP table Ta2A, and the ARP table Ta2B are stored in the storage unit 53.

FIG. 3 shows an example of the address table to be used in the switch device according to the embodiment of the present disclosure.

With reference to FIG. 3, in the address table Ta1, a port number "1" and a MAC address "MAC-A" of the communication port 54A are associated with each other, a port number "2" and a MAC address "MAC-B" of the communication port 54B are associated with each other, a port number "3" and a MAC address "MAC-C" of the communication port 54C are associated with each other, and a port number "4" and a MAC address "MAC-D" of the communication port 54D are associated with each other.

Figure 4:
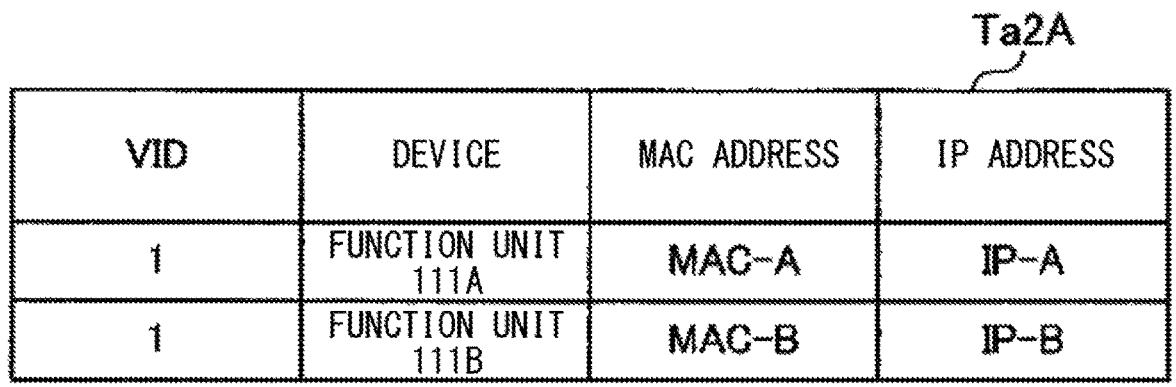
FIG. 4 shows an example of an ARP table Ta2A to be used in the switch device according to the embodiment of the present disclosure.

FIG. 4 shows an example of the ARP table Ta2A to be used in the switch device according to the embodiment of the present disclosure.

With reference to FIG. 4, in the ARP table Ta2A, with respect to each function unit 111 belonging to the first VLAN, the MAC address "MAC-A" and an IP address "IP-A" of the function unit 111A are associated with each other. The MAC address "MAC-B" and an IP address "IP-B" of the function unit 111B are associated with each other.

FIG. 5 shows an example of the ARP table Ta2B to be used in the switch device according to the embodiment of the present disclosure.

With reference to FIG. 5, in the ARP table Ta2B, with respect to each function unit 111 belonging to the second VLAN, the MAC address "MAC-C" and an IP address "IP-C" of the function unit 111C are associated with each other. The MAC address "MAC-D" and an IP address "IP-D" of the function unit 111D are associated with each other.

With reference to FIG. 1 and FIG. 2 again, for example, when the function unit 111A transmits an Ethernet frame to the function unit 111B, IP-A and IP-B are respectively included as the transmission source IP address and the transmission destination IP address in an IP packet stored in the Ethernet frame.

Since the function unit 111A and the function unit 111B both belong to the first VLAN, the function unit 111A writes 1, MAC-B, and MAC-A into the Ethernet frame, as the VID, the transmission destination MAC address, and the transmission source MAC address, respectively. Then, the function unit 111A transmits the Ethernet frame storing the IP packet therein, to the switch device 101.

Upon receiving, via the communication port 54A, the Ethernet frame transmitted from the function unit 111A, the switch unit 61 in the switch device 101 performs a switching process of the layer 2 on the received Ethernet frame, thereby transmitting the Ethernet frame to the function unit 111B via the communication port 54B.

That is, the switch unit 61 refers to the address table Ta1, and identifies a port number that corresponds to the transmission destination MAC address included in the received Ethernet frame. Then, the switch unit 61 transmits the received Ethernet frame, from the communication port 54 having the identified port number, specifically, the communication port 54B having the port number "2".

Meanwhile, when the function unit 111A transmits an Ethernet frame to the function unit 111D, IP-A and IP-D are respectively included as the transmission source IP address and the transmission destination IP address in an IP packet stored in the Ethernet frame.

Since the function unit 111A and the function unit 111D belong to VLANs different from each other, the function unit 111A writes 1, the MAC address of the switch device 101 which is the default gateway, and MAC-A into the Ethernet frame, as the VID, the transmission destination MAC address, and the transmission source MAC address, respectively. Then, the function unit 111A transmits the Ethernet frame storing the IP packet therein, to the switch device 101.

Upon receiving, via the communication port 54A, the Ethernet frame transmitted from the function unit 111A, the switch unit 61 in the switch device 101 performs a relay process of the layer 3 on the received Ethernet frame, thereby transmitting the Ethernet frame to the function unit 111D via the communication port 54D.

That is, the switch unit 61 acquires the transmission destination IP address from the IP packet included in the received Ethernet frame, refers to the ARP tables Ta2A, Ta2B, and rewrites the VID, the transmission destination MAC address, and the transmission source MAC address included in the received Ethernet frame, into 2, MAC-D, and the MAC address of the switch device 101, respectively.

The switch unit 61 refers to the address table Ta1, and identifies a port number that corresponds to the transmission destination MAC address included in the Ethernet frame. Then, the switch unit 61 transmits the received Ethernet frame from the communication port 54 having the identified port number, specifically, the communication port 54D having the port number "4".

(Calculation of Propagation Delay Time)

The calculation unit 52 calculates a propagation delay time of data between the switch device 101 and a function unit 111 on the slave side among the plurality of function units 111. Here, the function unit 111A and the function unit 111C are the function units 111 on the master side, and the function unit 111B and the function unit 111D are the function units 111 on the slave side.

Figure 6:
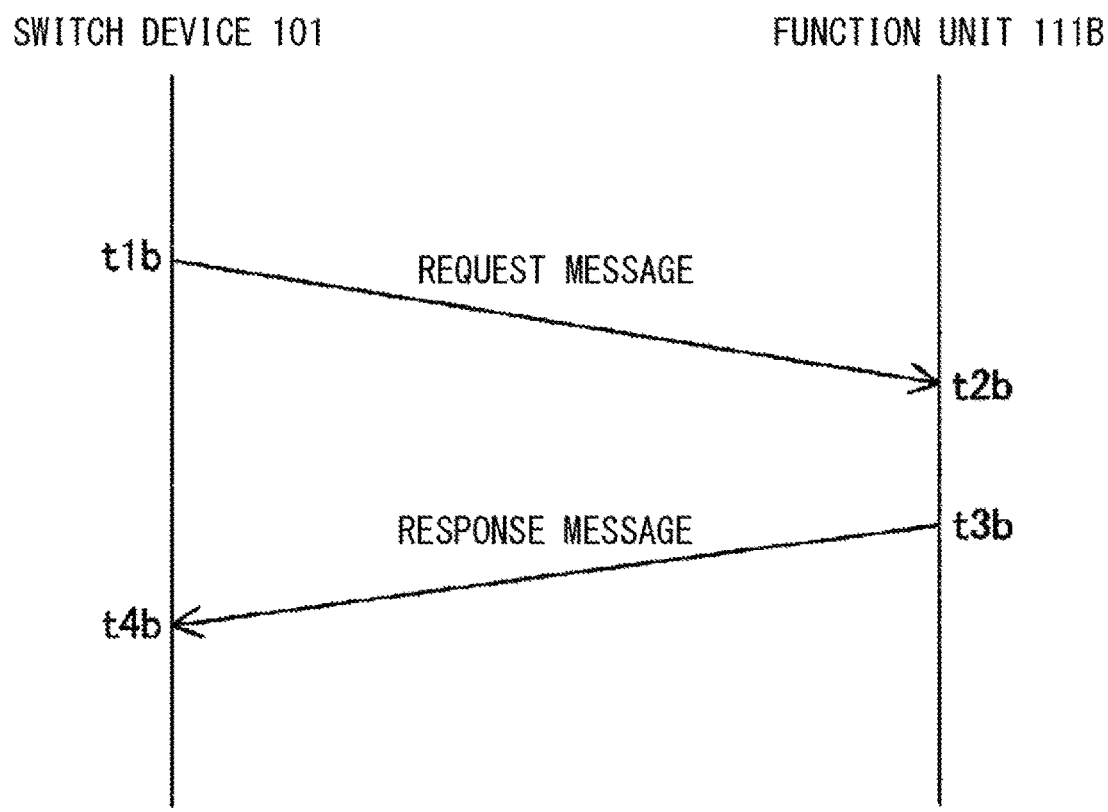
FIG. 6 illustrates a calculation method of a propagation delay time calculated by a calculation unit in the switch device according to the embodiment of the present disclosure.

FIG. 6 illustrates a calculation method of a propagation delay time calculated by the calculation unit in the switch device according to the embodiment of the present disclosure.

With reference to FIG. 6, for example, the control unit 62 periodically or non-periodically transmits a request message (Pdelay_Req) for calculating a propagation delay time Td2 of data between the function unit 111B and the switch device 101, to the function unit 111B via the communication port 54B. Here, it is assumed that the control unit 62 has transmitted a request message at a time t1*b*.

Upon receiving the request message transmitted from the switch device 101, the function unit 111B transmits a response message (Pdelay_Resp) to the request message, to the switch device 101. At this time, the function unit 111B causes the response message to include a reception time t2*b* of the request message and a transmission time t3*b* of the response message, and transmits the response message.

The control unit 62 in the switch device 101 receives, via the communication port 54B, the response message transmitted from the function unit 111B, and outputs the received response message to the calculation unit 52. In addition, the control unit 62 notifies the calculation unit 52 of the transmission time t1*b* of the request message and a reception time t4*b* of the response message.

The calculation unit 52 calculates the propagation delay time Td2 on the basis of the reception time t2*b* and the transmission time t3*b* included in the response message received from the control unit 62 and the transmission time t1*b* of the request message and the reception time t4*b* of the response message notified of from the control unit 62. Specifically, the calculation unit 52 calculates the propagation delay time Td2=((t4*b*−t1*b*)−(t3*b*−t2*b*))/2.

The calculation unit 52 also calculates a propagation delay time Td4 of data between the function unit 111D and the switch device 101, by a similar method.

A propagation delay time Td1 of data between the function unit 111A on the master side and the switch device 101 is calculated by the function unit 111A as described later. A propagation delay time Td3 of data between the function unit 111C on the master side and the switch device 101 is calculated by the function unit 111C as described later.

The switch device 101 may hold in advance the propagation delay times Td2, Td4 as fixed values. The function unit 111A may hold the propagation delay time Td1 in advance. The function unit 111C may hold the propagation delay time Td3 in advance.

(Calculation and Notification of Offset Information)

With reference to FIG. 1 and FIG. 2 again, the calculation unit 52 calculates time correction information for performing time synchronization between function units 111 belonging to different VLANs. Here, a case in which the calculation unit 52 calculates, as the time correction information, offset information indicating the difference between the time of the function unit 111A and the time of the function unit 111C, is described.

(a) Time Difference Between the Function Unit 111A and the Switch Device 101.

The function unit 111A periodically or non-periodically transmits a Sync message to the function unit 111B via the switch device 101. At this time, the function unit 111A causes a transmission time ts1 of the Sync message and the propagation delay time Td1 to be included in a correction Field in a payload part of the Sync message, and transmits the Sync message.

The relay unit 51 in the switch device 101 receives, via the communication port 54A, the Sync message transmitted from the function unit 111A. The switch unit 61 in the relay unit 51 transmits the received Sync message to the function unit 111B via the communication port 54B.

The control unit 62 in the relay unit 51 acquires the transmission time ts1 and the propagation delay time Td1 included in the Sync message from the function unit 111A. Then, the control unit 62 notifies the calculation unit 52 of the acquired transmission time ts1 and propagation delay time Td1, the reception time (Ingress Time) ti1 in the switch unit 61 of the Sync message, and a transmission time (Egress Time) te1 from the switch unit 61 of the Sync message.

On the basis of the transmission time ts1, the propagation delay time Td1, and the reception time ti1 of the Sync message notified of from the control unit 62, the calculation unit 52 calculates a time difference Tx1=ts1−Td1−ti1, which is the difference between the time of the function unit 111A and the time of the switch device 101.

(b) Time Difference Between the Function Unit 111C and the Switch Device 101

The function unit 111C periodically or non-periodically transmits a Sync message to the function unit 111D via the switch device 101. At this time, the function unit 111C causes a transmission time ts3 of the Sync message and the propagation delay time Td3 to be included in a correction Field in a payload part of the Sync message, and transmits the Sync message.

The relay unit 51 in the switch device 101 receives, via the communication port 54C, the Sync message transmitted from the function unit 111C. The switch unit 61 in the relay unit 51 transmits the received Sync message to the function unit 111D via the communication port 54D.

The control unit 62 in the relay unit 51 acquires the transmission time ts3 and the propagation delay time Td3 included in the Sync message from the function unit 111C, and notifies the calculation unit 52 of the transmission time ts3, the propagation delay time Td3, and a reception time ti3 of the Sync message.

On the basis of the transmission time ts3, the propagation delay time Td3, and the reception time ti3 of the Sync message notified of from the control unit 62, the calculation unit 52 calculates a time difference Tx3=ts3−Td3−ti3, which is the difference between the time of the function unit 111C and the time of the switch device 101.

(c) Time Difference Between the Function Unit 111A and the Function Unit 111C

On the basis of the calculated time difference Tx1 and time difference Tx3, the calculation unit 52 calculates a time difference Tx13=Tx1−Tx3, which is the difference between the time of the function unit 111A and the time of the function unit 111C. Then, the calculation unit 52 outputs offset information indicating the calculated time difference Tx13, to the notification unit 55.

In addition, for example, when the control unit 62 has received, via the communication port 54C, a request message transmitted from the function unit 111C, the control unit 62 outputs the received request message to the notification unit 55.

Upon receiving the request message outputted from the control unit 62, the notification unit 55 causes the offset information received from the calculation unit 52 to be included in the response message to the request message, and outputs the response message to the control unit 62.

Upon receiving the response message outputted from the notification unit 55, the control unit 62 causes the response message to include the reception time of the request message and the transmission time of the response message, and transmits the response message to the function unit 111C via the communication port 54C. Accordingly, the switch device 101 can notify the function unit 111C of the calculated offset information.

The calculation unit 52 may not necessarily use the propagation delay time Td1. For example, the calculation unit 52 may calculate, as the time difference Tx1, a value obtained by subtracting the reception time ti1 of the Sync message from the function unit 111A in the switch device 101, from the transmission time ts1 of the Sync message.

The calculation unit 52 may not necessarily use the propagation delay time Td3. For example, the calculation unit 52 may calculate, as the time difference Tx3, a value obtained by subtracting the reception time ti3 of the Sync message from the function unit 111C in the switch device 101, from the transmission time ts3 of the Sync message.

The notification unit 55 may cause the offset information to be included in data other than the response message, to notify the function unit 111.

The calculation unit 52 may calculate the offset information by using the transmission time from the function unit 111 of data other than the Sync message, and the reception time in the switch unit 61 of the data.

(Calculation and Notification of Retention Time Information)

The calculation unit 52 calculates a retention time TB of data in the switch device 101 on the basis of a reception time ti in the switch unit 61 of a Sync message and a transmission time to from the switch unit 61 of the Sync message, which have been notified of from the control unit 62.

For example, the calculation unit 52 calculates the retention time TB=te1−ti1 of data in the switch device 101, on the basis of the reception time ti1 in the switch unit 61 of a Sync message transmitted from the function unit 111A, and the transmission time te1 of the Sync message from the switch unit 61 to the function unit 111B.

On the basis of the calculated retention time TB and the propagation delay time, the calculation unit 52 creates second time correction information. For example, as the time correction information (second time correction information) In2 to be included in a Sync message from the function unit 111A to the function unit 111B, the calculation unit 52 creates information indicating the propagation delay time Td1 included in the Sync message, the retention time TB, and the propagation delay time Td2.

As the time correction information In2, the calculation unit 52 may create information indicating a total value of the propagation delay time Td1, the retention time TB, and the propagation delay time Td2.

In addition, for example, as the time correction information (second time correction information) In4 to be included in a Sync message from the function unit 111C to the function unit 111D, the calculation unit 52 creates information indicating the propagation delay time Td3 included in the Sync message, the retention time TB, and the propagation delay time Td4.

As the time correction information In4, the calculation unit 52 may create information indicating a total value of the propagation delay time Td3, the retention time TB, and the propagation delay time Td4.

Then, the calculation unit 52 outputs the created time correction information In2, In4 to the notification unit 55.

The notification unit 55 outputs the time correction information In2, In4 received from the calculation unit 52, to the control unit 62.

For example, it is assumed that the control unit 62 has received a Sync message including the MAC address "MAC-B" of the function unit 111B as the transmission destination MAC address, from the function unit 111A via the communication port 54A. In this case, the control unit 62 causes the Sync message to include the time correction information In2 received from the notification unit 55.

Accordingly, the propagation delay time Td1, the retention time TB, and the propagation delay time Td2 are included in the Sync message to be transmitted from the switch device 101. Then, the control unit 62 transmits the Sync message to the function unit 111B via the communication port 54B.

Meanwhile, for example, it is assumed that the control unit 62 has received a Sync message including the MAC address "MAC-D" of the function unit 111D as the transmission destination MAC address, from the function unit 111C via the communication port 54C. In this case, the control unit 62 causes the Sync message to include the time correction information In4 received from the notification unit 55.

Accordingly, the propagation delay time Td3, the retention time TB, and the propagation delay time Td4 are included in the Sync message to be transmitted from the switch device 101. Then, the control unit 62 transmits the Sync message to the function unit 111D via the communication port 54D.

[Function Unit on Master Side]

Figure 7:
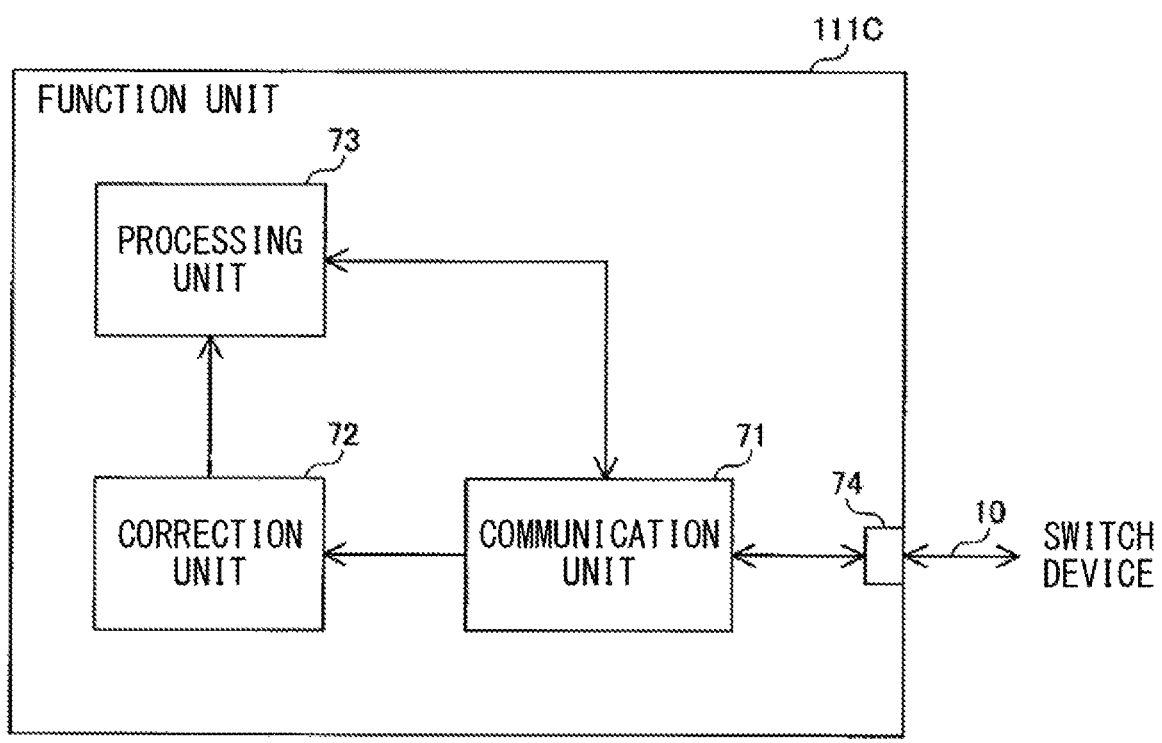
FIG. 7 shows a configuration of a function unit on the master side in the on-vehicle communication system according to the embodiment of the present disclosure.

FIG. 7 shows a configuration of a function unit on the master side in the on-vehicle communication system according to the embodiment of the present disclosure. FIG. 7 shows a configuration of the function unit 111C shown in FIG. 1. The configuration of the function unit 111A shown in FIG. 1 is the same as the configuration of the function unit 111C shown in FIG. 7.

With reference to FIG. 7, the function unit 111C includes a communication unit (acquisition unit) 71, a correction unit 72, a processing unit 73, and a communication port 74.

The communication port 74 is a terminal to which an Ethernet cable 10 can be connected, for example. The communication port 74 may be a terminal of an integrated circuit, or the like. The communication port 74 is connected to the switch device 101 via an Ethernet cable 10.

(Calculation of Propagation Delay Time)

The processing unit 73 calculates the propagation delay time Td3 of data between the function unit 111C and the switch device 101.

More specifically, the processing unit 73 periodically or non-periodically transmits a request message for calculating the propagation delay time Td3, to the switch device 101 via the communication unit 71 and the communication port 74. Here, it is assumed that the processing unit 73 has transmitted the request message at a time t1c.

Upon receiving, via the communication port 54C, the request message transmitted from the function unit 111C, the control unit 62 in the switch device 101 transmits a response message to the request message, to the function unit 111C via the communication port 54C. At this time, the control unit 62 causes the response message to include a reception time t2c of the request message and a transmission time t3c of the response message, and transmits the response message.

The processing unit 73 in the function unit 111C receives the response message transmitted from the switch device 101, via the communication port 74 and the communication unit 71. Then, the processing unit 73 calculates the propagation delay time Td3 on the basis of the transmission time t1c of the request message, the reception time t2c and the transmission time t3c included in the received response message, and a reception time t4c of the response message.

Specifically, the processing unit 73 calculates the propagation delay time Td3=((t4c−t1c)−(t3c−t2c))/2.

Then, for example, the processing unit 73 causes a Sync message to the function unit 111D to include the calculated propagation delay time Td3 and the transmission time of the Sync message, and periodically or non-periodically transmits the Sync message to the switch device 101 via the communication unit 71 and the communication port 74.

The processing unit 73 in the function unit 111A performs a process similar to that performed by the processing unit 73 of the function unit 111C, thereby calculating the propagation delay time Td1 of data between the function unit 111A and the switch device 101.

Then, for example, the processing unit 73 in the function unit 111A causes a Sync message to the function unit 111B to include the calculated propagation delay time Td1 and the transmission time of the Sync message, and periodically or non-periodically transmits the Sync message to the switch device 101 via the communication unit 71 and the communication port 74.

(Reception of Offset Information and Time Correction)

The processing unit 73 in the function unit 111C transmits a request message to the switch device 101 via the communication port 74.

The communication unit 71 receives, via the communication port 74, a response message, to the request message, which has been transmitted from the switch device 101, and outputs the received response message to the correction unit 72.

As described above, the response message transmitted from the switch device 101 includes the offset information, the reception time of the request message, and the transmission time of the response message.

Upon receiving the response message from the communication unit 71, the correction unit 72 corrects the time of the function unit 111C on the basis of the offset information, the reception time of the request message, and the transmission time of the response message included in the response message.

Here, it is assumed that the offset information included in the response message indicates the time difference Tx13 between the time of the function unit 111A and the time of the function unit 111C. In this case, on the basis of the time difference Tx13 indicated by the offset information, the reception time of the request message, and the transmission time of the response message, the correction unit 72 performs correction of setting the time of the function unit 111C to the time of the function unit 111A.

Accordingly, time synchronization is realized between the function unit 111C and the function unit 111A, and the transmission time, of a Sync message to be transmitted from the function unit 111C, that is included in the Sync message becomes the time that is synchronized with the time of the function unit 111A.

[Function Unit on Slave Side]

Figure 8:
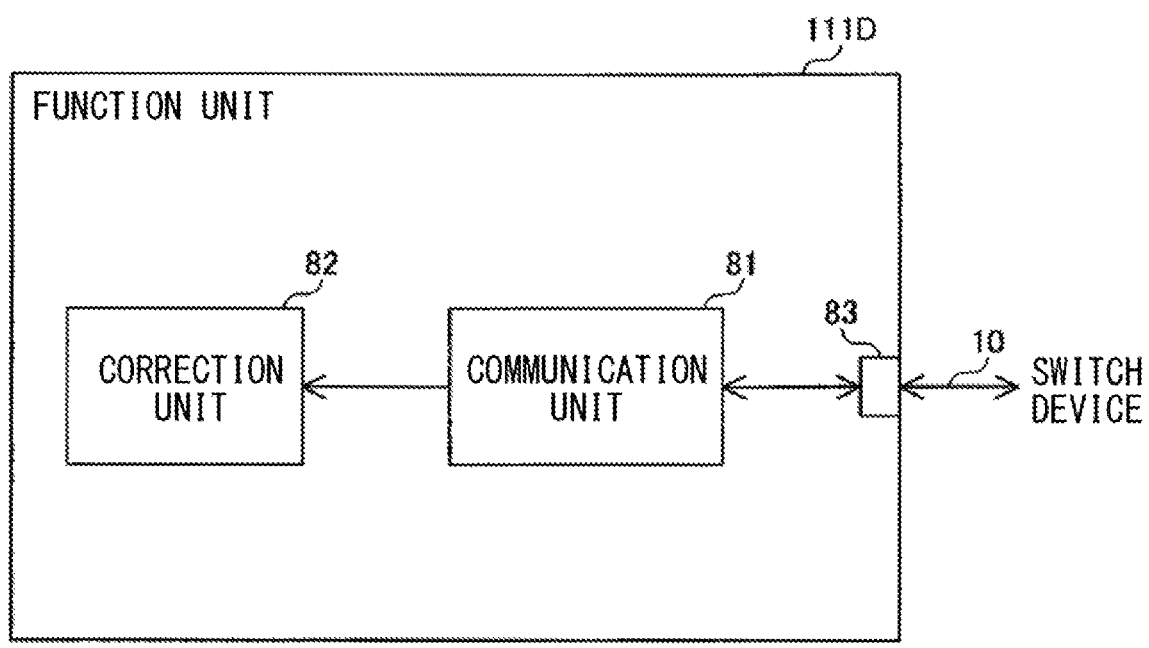
FIG. 8 shows a configuration of a function unit on the slave side in the on-vehicle communication system according to the embodiment of the present disclosure.

FIG. 8 shows a configuration of a function unit on the slave side in the on-vehicle communication system according to the embodiment of the present disclosure. FIG. 8 shows a configuration of the function unit 111D shown in FIG. 1. The configuration of the function unit 111B shown in FIG. 1 is the same as the configuration of the function unit 111D shown in FIG. 8.

With reference to FIG. 8, the function unit 111D includes a communication unit (acquisition unit) 81, a correction unit 82 and a communication port 83.

The communication port 83 is a terminal to which an Ethernet cable 10 can be connected, for example. The communication port 83 may be a terminal of an integrated circuit, or the like. The communication port 83 is connected to the switch device 101 via an Ethernet cable 10.

For example, the communication unit 81 receives a Sync message transmitted from the function unit 111C, via the communication port 83 and the switch device 101, and outputs the received Sync message to the correction unit 82.

As described above, the function unit 111C causes the Sync message to the function unit 111D to include the transmission time after the time correction and the propagation delay time Td3, and transmits the Sync message to the switch device 101. The switch device 101 causes the Sync message to include the retention time TB and the propagation delay time Td4, and transmits the Sync message to the function unit 111D.

Thus, the Sync message received by the correction unit 82 in the function unit 111D includes the transmission time from the function unit 111C, the propagation delay time Td3, the retention time TB, and the propagation delay time Td4.

The notification unit 55 in the switch device 101 may calculate a total value of the propagation delay time Td3, the retention time TB, and the propagation delay time Td4, and cause the Sync message to include the calculated total value. In this case, the Sync message includes the transmission time from the function unit 111C and the above-described total value.

Upon receiving the Sync message from the communication unit 81, the correction unit 82 corrects the time of the function unit 111D on the basis of the transmission time, the propagation delay time Td3, the retention time TB, and the propagation delay time Td4 included in the Sync message. As described above, the transmission time included in the Sync message from the function unit 111C is the time that is synchronized with the time of the function unit 111A. Thus, when the correction unit 82 performs time correction, time synchronization between the function unit 111D and the function unit 111C is established, whereby time synchronization between the function unit 111D and the function unit 111A is established.

At the time of transmitting the Sync message to the function unit 111D, the function unit 111C may not necessarily cause the Sync message to include the transmission time synchronized with the function unit 111A.

In this case, for example, the processing unit 73 in the function unit 111C causes the Sync message to the function unit 111D to include the offset information, in addition to the transmission time of the Sync message before the time correction, and the propagation delay time Td3.

Then, the correction unit 82 in the function unit 111D corrects the time of the function unit 111D on the basis of the transmission time, the propagation delay time Td3, and the offset information which are included in the Sync message by the function unit 111C, and the retention time TB and the propagation delay time Td4 which are included in the Sync message by the switch device 101. Accordingly, time synchronization between the function unit 111D and the function unit 111C is established, and as a result, time synchronization between the function unit 111D and the function unit 111A is established.

Application Example

With reference to FIG. 1 again, here, it is assumed that: the function unit 111A is an extra-vehicular communication ECU; the function unit 111B is a navigation device; the function unit 111C is a sensor; and the function unit 111D is an automated driving processing ECU.

A processing unit (not shown) in the switch device 101 manages the transmission timing of data from each function unit 111. For example, the switch device 101 designates, to the sensor 111C, a transmission time of data such that a measurement result by the sensor 111C is periodically transmitted to the automated driving processing ECU 111D belonging to the same VLAN as that of the sensor 111C.

For example, the switch device 101 designates, to the extra-vehicular communication ECU 111A, a transmission time of data such that map information acquired by the extra-vehicular communication ECU 111A from outside the vehicle 1 is periodically transmitted to the navigation device 111B belonging to the same VLAN as that of the extra-vehicular communication ECU 111A.

For example, the switch device 101 designates, to the extra-vehicular communication ECU 111A, a transmission time of data such that map information acquired by the extra-vehicular communication ECU 111A from outside the vehicle 1 is transmitted to the automated driving processing ECU 111D belonging to a VLAN different from that of the extra-vehicular communication ECU 111A.

At this time, the switch device 101 sets the transmission times of the data from the extra-vehicular communication ECU 111A to the automated driving processing ECU 111D and of the data from the sensor 111C to the automated driving processing ECU 111D such that occurrence of packet loss due to collision or the like between the pieces of data is prevented.

However, in a case where time synchronization between the extra-vehicular communication ECU 111A and the sensor 111C has not been established, even if each of the extra-vehicular communication ECU 111A and the sensor 111C transmits data at the designated transmission time, packet loss could occur due to collision or the like between the data from the extra-vehicular communication ECU 111A and the data from the sensor 111C because of the difference between the time of the function unit 111A and the time of the function unit 111C.

In contrast to this, as described above, in the on-vehicle communication system 301 according to the embodiment of the present disclosure, it is possible to perform time synchronization between the extra-vehicular communication ECU 111A and the sensor 111C belonging to different VLANs from each other. Thus, collision or the like between data from the extra-vehicular communication ECU 111A and the data from the sensor 111C can be prevented, and occurrence of packet loss can be inhibited.

[Operation Flow]

Each device in the on-vehicle communication system 301 includes a computer. An arithmetic processing unit such as a CPU in the computer reads out, from a memory, a program including a part or all of steps in the sequence diagram described below and executes the program. Programs of the plurality of devices can each be installed from outside. The programs of the plurality of devices are each distributed in a state of being stored in a storage medium.

(Time Correction Between Function Units Belonging to Different VLANs)

Figure 9:
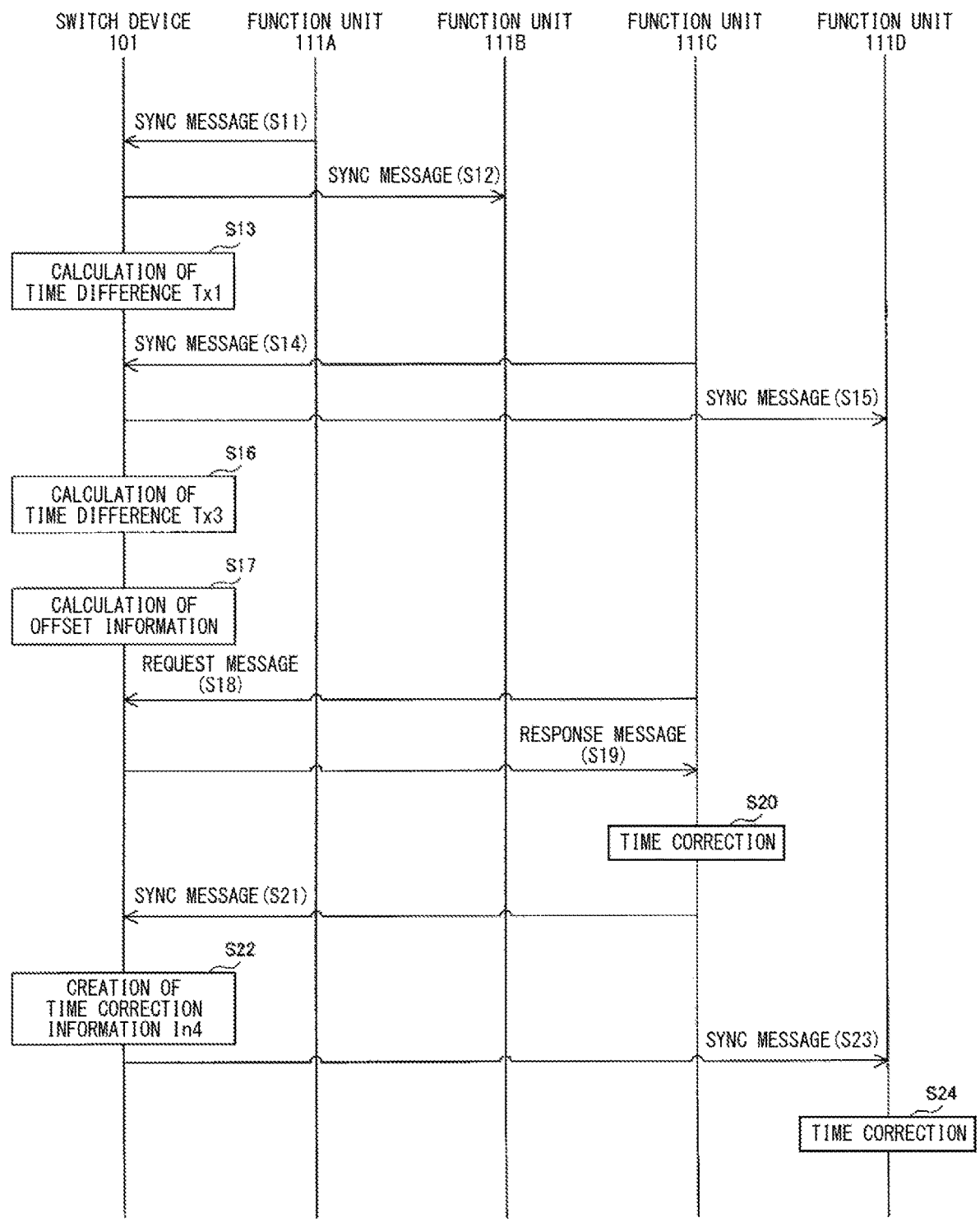
FIG. 9 is a flow chart describing an operation procedure of time correction between function units belonging to different VLANs in the on-vehicle communication system according to the embodiment of the present disclosure.

FIG. 9 is a flow chart describing an operation procedure of time correction between function units belonging to different VLANs in the on-vehicle communication system according to the embodiment of the present disclosure. Here, a case in which time synchronization between the function unit 111A belonging to the first VLAN and the function unit 111D belonging to the second VLAN is established, is described.

It is assumed that: through the operation shown in FIG. 10 described later, time synchronization between the function unit 111A and the function unit 111B which belong to the same VLAN has been established; and time synchronization between the function unit 111C and the function unit 111D which belong to the same VLAN has been established.

In addition, it is assumed that: the function unit 111A has already calculated the propagation delay time Td1; the function unit 111C has already calculated the propagation delay time Td3; and the switch device 101 has already calculated the propagation delay times Td2, Td4, and the retention time TB.

With reference to FIG. 9, first, the function unit 111A transmits, to the switch device 101, a Sync message including the MAC address "MAC-B" of the function unit 111B as the transmission destination MAC address. At this time, the function unit 111A causes the Sync message to include the transmission time ts1 of the Sync message and the propagation delay time Td1, and transmits the Sync message (step S11).

Next, the switch device 101 acquires the transmission time ts1 and the propagation delay time Td1 included in the Sync message received from the function unit 111A, and transmits the Sync message to the function unit 111B (step S12).

Next, on the basis of the acquired transmission time ts1 and propagation delay time Td1, and the reception time ti1 in the switch device 101 of the Sync message, the switch device 101 calculates the time difference Tx1 between the time of the function unit 111A and the time of the switch device 101 (step S13).

Next, the function unit 111C transmits, to the switch device 101, a Sync message including the MAC address "MAC-D" of the function unit 111D as the transmission destination MAC address. At this time, the function unit 111C causes the Sync message to include the transmission time ts3 of the Sync message and the propagation delay time Td3 and transmits the Sync message (step S14).

Next, the switch device 101 acquires the transmission time ts3 and the propagation delay time Td3 included in the Sync message transmitted from the function unit 111C, and transmits the Sync message to the function unit 111D (step S15).

Next, on the basis of the acquired transmission time ts3 and propagation delay time Td3, and the reception time ti3 in the switch device 101 of the Sync message, the switch device 101 calculates the time difference Tx3 between the time of the function unit 111C and the time of the switch device 101 (step S16).

Next, on the basis of the calculated time difference Tx1 and time difference Tx3, the switch device 101 calculates offset information. That is, the switch device 101 calculates the offset information indicating the time difference Tx13 between the time of the function unit 111A and the time of the function unit 111C (step S17).

Next, the function unit 111C transmits a request message to the switch device 101 (step S18).

Next, the switch device 101 transmits, to the function unit 111C, a response message to the request message received from the function unit 111C. At this time, the switch device 101 causes the response message to include the reception time of the request message in the switch device 101, the transmission time of the response message, and the calculated offset information, and transmits the response message (step S19).

Next, on the basis of the reception time of the request message, the transmission time of the response message, and the offset information, which are indicated by the response message received from the switch device 101, the function unit 111C performs time correction of synchronizing the time of the function unit 111C with the time of the function unit 111A (step S20).

Next, the function unit 111C transmits, to the switch device 101, a Sync message including the MAC address "MAC-D" of the function unit 111D as the transmission destination MAC address. At this time, the function unit 111C causes the Sync message to include the transmission time of the Sync message after the time correction and the propagation delay time Td3, and transmits the Sync message (step S21).

Next, the switch device 101 creates time correction information In4 on the basis of the propagation delay time Td3 included in the Sync message received from the function unit 111C, and the retention time TB and the propagation delay time Td4 which have already been calculated (step S22).

Next, the switch device 101 causes the Sync message received from the function unit 111C to include the created time correction information In4, and transmits the Sync message to the function unit 111D (step S23).

Next, the function unit 111D performs time correction of synchronizing the time of the function unit 111D with the time of the function unit 111A on the basis of the transmission time from the function unit 111C and the time correction information In4 included in the Sync message received from the switch device 101, i.e., the transmission time from the function unit 111C after the time correction, the propagation delay time Td3, the retention time TB, and the propagation delay time Td4 (step S24).

The operations of steps S11 to S13 may be performed after the operations of steps S14 to S16, or may be performed in parallel with the operations of steps S14 to S16.

(Time Correction Between Function Units Belonging to the Same VLAN)

Figure 10:
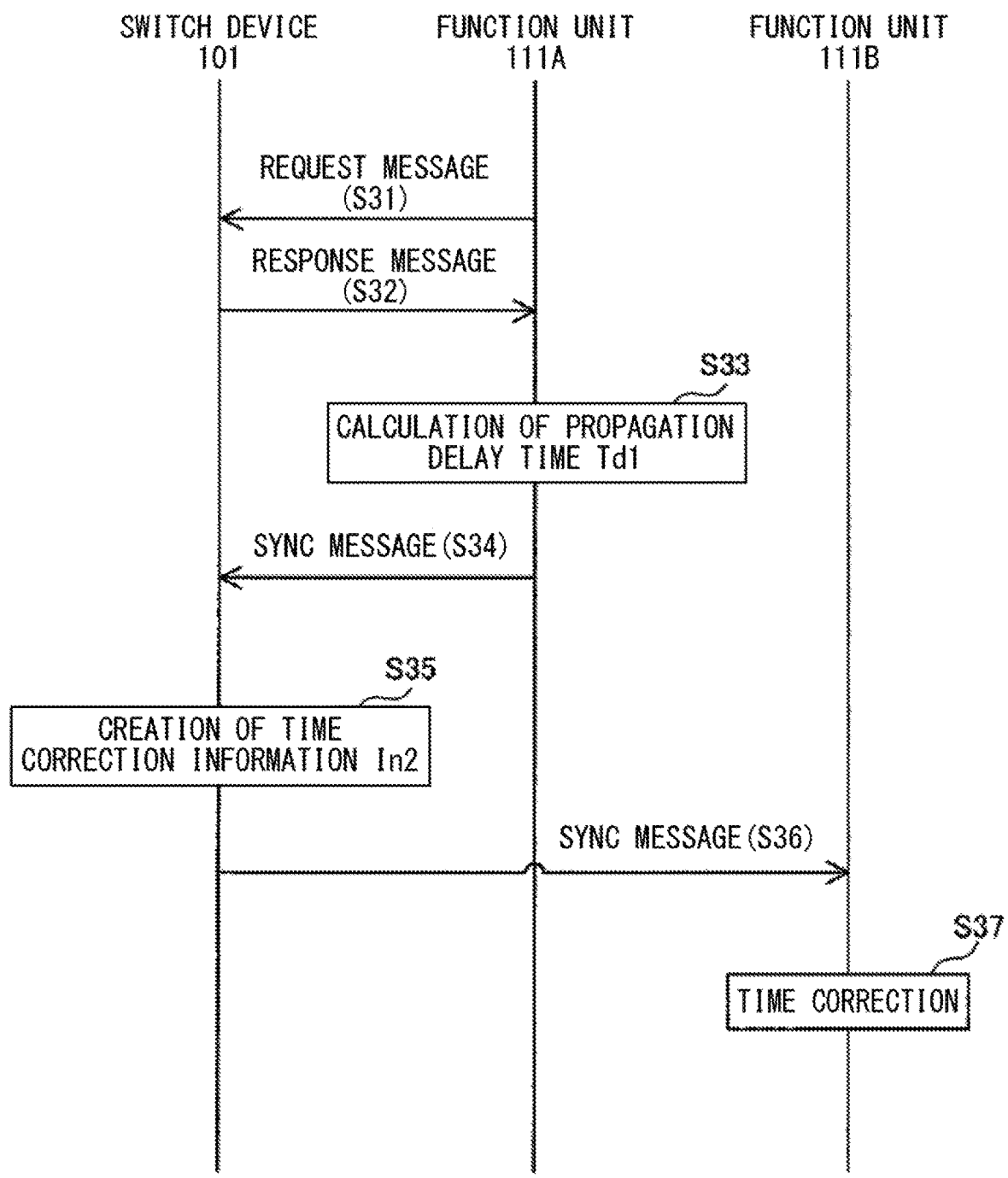
FIG. 10 is a flow chart describing an operation procedure of time correction between function units belonging to the same VLAN in the on-vehicle communication system according to the embodiment of the present disclosure.

FIG. 10 is a flow chart describing an operation procedure of time correction between function units belonging to the same VLAN in the on-vehicle communication system according to the embodiment of the present disclosure. Here, a case in which time synchronization between the function unit 111A belonging to the first VLAN and the function unit 111B belonging to the same the first VLAN is performed, is described.

It is assumed that the switch device 101 has already calculated the retention time TB and the propagation delay time Td2.

With reference to FIG. 10, first, the function unit 111A transmits a request message to the switch device 101 (step S31).

Next, the switch device 101 transmits, to the function unit 111A, a response message to the request message received from the function unit 111A. At this time, the switch device 101 causes the response message to include a reception time t2a of the request message and a transmission time t3a of the response message, and transmits the response message (step S32).

Next, the function unit 111A calculates the propagation delay time Td1 of data between the function unit 111A and the switch device 101 on the basis of the reception time t2a and the transmission time t3a included in the response message received from the switch device 101, a reception time t4a of the response message, and a transmission time t1a of the request message transmitted to the switch device 101 in step S31 (step S33).

Next, the function unit 111A transmits, to the switch device 101, a Sync message including the MAC address "MAC-B" of the function unit 111B as the transmission destination MAC address. At this time, the function unit 111A causes the Sync message to include the transmission time of the Sync message and the calculated propagation delay time Td1, and transmits the Sync message (step S34).

Next, the switch device 101 creates time correction information In2 on the basis of the propagation delay time Td1 included in the Sync message received from the function unit 111A, and the retention time TB and the propagation delay time Td2 which have already been calculated (step S35).

Next, the switch device 101 causes the Sync message received from the function unit 111A to include the created time correction information In2, and transmits the Sync message to the function unit 111B (step S36).

Next, the function unit 111B performs time correction of synchronizing the time of the function unit 111B with the time of the function unit 111A on the basis of the transmission time from the function unit 111A and the time correction information In2 included in the Sync message received from the switch device 101, i.e., the transmission time from the function unit 111A, the propagation delay time Td1, the retention time TB, and the propagation delay time Td2 (step S37).

Meanwhile, as a technology for performing time synchronization between devices connected via Ethernet cables, gPTP (generalized Precision Time Protocol) is known.

However, gPTP is a protocol for performing time synchronization between devices by using the MAC address of each device belonging to the same VLAN, and cannot perform time synchronization between devices belonging to different VLANs, from the viewpoint of security.

In contrast to this, in the switch device 101 according to the embodiment of the present disclosure, the relay unit 51 performs a first relay process of relaying data between function units 111 installed in the vehicle 1 and belonging to different VLANs. The calculation unit 52 calculates offset information on the basis of the transmission time ts1 of data from the function unit 111A to the switch device 101, the reception time ti1 in the switch device 101 of the data transmitted from the function unit 111A, the transmission time ts3 of data from the function unit 111C to the switch device 101, and the reception time ti3 in the switch device 101 of the data transmitted from the function unit 111C. Then, the notification unit 55 notifies the function unit 111C of the offset information calculated by the calculation unit 52.

With this configuration, for example, the switch device 101 can calculate the difference Tx1 between the time of the function unit 111A and the time of the switch device 101 and the difference Tx3 between the time of the function unit 111C and the time of the switch device 101, and can calculate, as the time correction information, the offset information indicating the difference Tx13 between the time of the function unit 111A and the time of the function unit 111C. Accordingly, the function unit 111C can establish time synchronization with the function unit 111A by using the notified offset information.

Therefore, in the switch device 101 according to the embodiment of the present disclosure, time synchronization between function units 111 belonging to different VLANs can be realized.

In the switch device 101 according to the embodiment of the present disclosure, the calculation unit 52 calculates the offset information further on the basis of the propagation delay time Td1 of data between the function unit 111A and the switch device 101, and the propagation delay time Td3 of data between the function unit 111C and the switch device 101.

With this configuration, for example, the difference Tx1 between the time of the function unit 111A and the time of the switch device 101, and the difference Tx3 between the time of the function unit 111C and the time of the switch device 101 can be more accurately calculated. Thus, the offset information can be more accurately calculated.

The function unit 111 according to the embodiment of the present disclosure performs time synchronization with another function unit 111 installed in the vehicle 1 and belonging to the same VLAN as that of the function unit 111, by using a propagation delay time of data between the function unit 111 and the other function unit 111. The notification unit 55 in the switch device 101 causes offset information to be included in a response message to a request message transmitted from the function unit 111C for calculating the propagation delay time Td3, and transmits the response message to the function unit 111C.

With this configuration, the function unit 111C can acquire the propagation delay time Td3 and the offset information on the basis of the response message received from the switch device 101. Thus, the function unit 111C can establish time synchronization with the function unit 111D belonging to the same VLAN as that of the function unit 111C, by using the propagation delay time Td3 and the offset information that have been acquired.

The function unit 111 according to the embodiment of the present disclosure performs time synchronization with another function unit 111 installed in the vehicle 1 and belonging to the same VLAN as that of the function unit 111, by causing a Sync message to include a propagation delay time of data between the function unit 111 and the other function unit 111 and transmitting the Sync message. The calculation unit 52 in the switch device 101 calculates the offset information by using the transmission time ts1, ts3 and the reception time ti1, ti3 of the Sync message.

Since the offset information is calculated by using the Sync message transmitted between the function units 111 belonging to the same VLAN, the offset information can be periodically or non-periodically updated, for example. Therefore, time synchronization using more accurate offset information can be performed.

In the switch device 101 according to the embodiment of the present disclosure, the relay unit 51 performs a second relay process of relaying data between function units 111 installed in the vehicle 1 and belonging to the same VLAN. The calculation unit 52 creates second time correction information based on: the propagation delay times Td3, Td4 of data between the function unit 111C and the function unit 111D belonging to the same VLAN, and the switch device 101; and the retention time TB of data in the switch device 101. Then, the notification unit 55 notifies the function unit 111D of the second time correction information created by the calculation unit 52.

With this configuration, the function unit 111D can establish time synchronization with the function unit 111C, by using the difference between the time of the function unit 111C and the time of the switch device 101, the difference between the time of the function unit 111D and the time of the switch device 101, and the retention time TB of data in the switch device 101.

In the function unit 111 according to the embodiment of the present disclosure, from the switch device 101 which performs the first relay process of relaying data between function units 111 installed in the vehicle 1 and belonging to different VLANs, the communication unit 71 acquires offset information calculated on the basis of the transmission time ts1 of data from the function unit 111A to the switch device 101, the reception time ti1 in the switch device 101 of the data transmitted from the function unit 111A, the transmission time ts3 of data from the function unit 111C to the switch device 101, and the reception time ti3 in the switch device 101 of the data transmitted from the function unit 111C. Then, the correction unit 72 corrects the time of the function unit 111 to which the correction unit 72 belongs, on the basis of the offset information acquired by the communication unit 71.

With this configuration, for example, the function unit 111 can establish time synchronization with another function unit 111 belonging to a VLAN different from that of the function unit 111, by using the difference between the time of the function unit 111 and the time of the other function unit 111.

Therefore, in the function unit 111 according to the embodiment of the present disclosure, time synchronization between function units 111 belonging to different VLANs can be realized.

In the on-vehicle communication system 301 according to the embodiment of the present disclosure, the switch device 101 performs the first relay process of relaying data between function units 111 installed in the vehicle 1 and belonging to different VLANs. The switch device 101 calculates offset information on the basis of the transmission time ts1 of data from the function unit 111A to the switch device 101, the reception time ti1 in the switch device 101 of the data transmitted from the function unit 111A, the transmission time ts3 of data from the function unit 111C to the switch device 101, and the reception time ti3 in the switch device 101 of the data transmitted from the function unit 111C. Then, the switch device 101 transmits the calculated offset information to the function unit 111C. Then, the function unit 111C receives the offset information transmitted from the switch device 101, and corrects the time of the function unit 111C on the basis of the received offset information.

With this configuration, for example, the switch device 101 can calculate the difference Tx1 between the time of the function unit 111A and the time of the switch device 101, and the difference Tx3 between the time of the function unit 111C and the time of the switch device 101, and can calculate, as time correction information, the offset information indicating the difference Tx13 between the time of the function unit 111A and the time of the function unit 111C. Accordingly, the function unit 111C can establish time synchronization with the function unit 111A by using the notified offset information.

Therefore, in the on-vehicle communication system 301 according to the embodiment of the present disclosure, time synchronization between function units 111 belonging to different VLANs can be realized.

In a time correction method to be performed in the switch device 101 according to the embodiment of the present disclosure, first, the calculation unit 52 calculates offset information on the basis of the transmission time ts1 of data from the function unit 111A to the switch device 101, the reception time ti1 in the switch device 101 of the data transmitted from the function unit 111A, the transmission time ts3 of data from the function unit 111C to the switch device 101, and the reception time ti3 in the switch device 101 of the data transmitted from the function unit 111C.

Next, the notification unit 55 notifies the function unit 111C of the offset information calculated by the calculation unit 52.

With this method, for example, the switch device 101 can calculate the difference Tx1 between the time of the function unit 111A and the time of the switch device 101, and the difference Tx3 between the time of the function unit 111C and the time of the switch device 101, and can calculate, as time correction information, the offset information indicating the difference Tx13 between the time of the function unit 111A and the time of the function unit 111C. Accordingly, the function unit 111C can establish time synchronization with the function unit 111A by using the notified offset information.

Therefore, in the time correction method to be performed in the switch device 101 according to the embodiment of the present disclosure, time synchronization between function units 111 belonging to different VLANs can be realized.

In a time correction method to be performed in the function unit 111 according to the embodiment of the present disclosure, first, from the switch device 101 which performs the first relay process of relaying data between function units 111 belonging to different VLANs, the communication unit 71 acquires offset information calculated based on the transmission time ts1 of data from the function unit 111A to the switch device 101, the reception time ti1 in the switch device 101 of the data transmitted from the function unit 111A, the transmission time ts3 of data from the function unit 111C to the switch device 101, and the reception time ti3 in the switch device 101 of the data transmitted from the function unit 111C. Next, the correction unit 72 corrects the time of the function unit 111 to which the correction unit 72 belongs, on the basis of the offset information acquired by the communication unit 71.

With this configuration, the function unit 111 can establish time synchronization with another function unit 111 belonging to a VLAN different from that of the function unit 111, by using the difference between the time of the function unit 111 and the time of the other function unit 111.

Therefore, in the time correction method to be performed in the function unit 111 according to the embodiment of the present disclosure, time synchronization between function units 111 belonging to different VLANs can be realized.

In a time correction method to be performed in the on-vehicle communication system 301 according to the embodiment of the present disclosure, first, the switch device 101 calculates offset information on the basis of the transmission time ts1 of data from the function unit 111A to the switch device 101, the reception time ti1 in the switch device 101 of the data transmitted from the function unit 111A, the transmission time ts3 of data from the function unit 111C to the switch device 101, and the reception time ti3 in the switch device 101 of the data transmitted from the function unit 111C. Next, the switch device 101 transmits the calculated offset information to the function unit 111C. Then, the function unit 111C receives the offset information transmitted from the switch device 101, and corrects the time of the function unit 111C on the basis of the received offset information.

With this method, for example, the switch device 101 can calculate the difference Tx1 between the time of the function unit 111A and the time of the switch device 101 and the difference Tx3 between the time of the function unit 111C and the time of the switch device 101, and can calculate, as time correction information, the offset information indicating the difference Tx13 between the time of the function unit 111A and the time of the function unit 111C. Accordingly, the function unit 111C can establish time synchronization with the function unit 111A by using the notified offset information.

Therefore in the time correction method to be performed in the on-vehicle communication system 301 according to the embodiment of the present disclosure, time synchronization between function units 111 belonging to different VLANs can be realized.

The disclosed embodiments are merely illustrative in all aspects and should not be recognized as being restrictive. The scope of the present disclosure is defined by the scope of the claims rather than by the description above, and is intended to include meaning equivalent to the scope of the claims and all modifications within the scope.

The above description includes the features in the additional notes below.

[Additional Note 1]

A switch device comprising:

a relay unit configured to perform a first relay process of relaying data between function units installed in a vehicle and belonging to different VLANs (Virtual Local Area Networks);

a calculation unit configured to calculate time correction information on the basis of a transmission time of data from a first function unit serving as the function unit to the switch device, a reception time in the switch device of the data transmitted from the first function unit, a transmission time of data from a second function unit serving as the function unit to the switch device, and a reception time in the switch device of the data transmitted from the second function unit; and a notification unit configured to notify the second function unit of the time correction information calculated by the calculation unit, wherein transmission/reception of information using an Ethernet frame storing an IP packet therein is performed between the switch device and each function unit, and the switch device calculates a difference between time of the first function unit and time of the switch device, and a difference between time of the second function unit and time of the switch device, thereby calculating a difference between time of the first function unit and time of the second function unit, and calculates, as the time correction information, offset information indicating the calculated difference.

[Additional Note 2]

An on-vehicle communication device to be installed in a vehicle, the on-vehicle communication device comprising:

an acquisition unit configured to, from a switch device configured to perform a first relay process of relaying data between the on-vehicle communication devices belonging to different VLANs, acquire time correction information calculated on the basis of a transmission time of data from a first on-vehicle communication device serving as the on-vehicle communication device to the switch device, a reception time in the switch device of the data transmitted from the first on-vehicle communication device, a transmission time of data from a second on-vehicle communication device serving as the on-vehicle communication device to the switch device, and a reception time in the switch device of the data transmitted from the second on-vehicle communication device; and a correction unit configured to correct time of the on-vehicle communication device to which the correction unit belongs, on the basis of the time correction information acquired by the acquisition unit, wherein the on-vehicle communication device is an extra-vehicular communication ECU, a sensor, a camera, a navigation device, an automated driving processing ECU, an engine control device, an AT control device, an HEV control device, a brake control device, a chassis control device, a steering control device, or an instrument indication control device, the on-vehicle communication device performs time synchronization with another on-vehicle communication device installed in the vehicle and belonging to the same VLAN as that of the on-vehicle communication device, by causing a message to include a propagation delay time of data between the on-vehicle communication device and the other on-vehicle communication device, and transmits the message, and the message is a Sync message periodically or non-periodically transmitted from the on-vehicle communication device to the other on-vehicle communication device.

REFERENCE SIGNS LIST 1 vehicle
10 Ethernet cable
51 relay unit
52 calculation unit
53 storage unit
54, 54A, 54B, 54C, 54D communication port
55 notification unit
61 switch unit
62 control unit
71, 81 communication unit (acquisition unit)
72, 82 correction unit
73 processing unit
74, 83 communication port
101 switch device
111, 111A, 111B, 111C, 111D function unit (on-vehicle communication device)
301 on-vehicle communication system

The invention claimed is:

1. A switch device comprising:
a relay unit configured to perform a first relay process of relaying data between function units installed in a vehicle and belonging to different VLANs (Virtual Local Area Networks);
a calculation unit configured to calculate time correction information on the basis of a transmission time of data from a first function unit serving as the function unit to the switch device, a reception time in the switch device of the data transmitted from the first function unit, a transmission time of data from a second function unit serving as the function unit to the switch device, and a reception time in the switch device of the data transmitted from the second function unit; and
a notification unit configured to notify the second function unit of the time correction information calculated by the calculation unit.

2. The switch device according to claim 1, wherein
the calculation unit calculates the time correction information further on the basis of a propagation delay time of data between the first function unit and the switch device and a propagation delay time of data between the second function unit and the switch device.

3. The switch device according to claim 1, wherein
the function unit performs time synchronization with another function unit installed in the vehicle and belonging to the same VLAN as that of the function unit, by using a propagation delay time of data between the function unit and the other function unit, and the notification unit causes the time correction information to be included in a response message to a message transmitted from the second function unit for calculating the propagation delay time, and transmits the response message to the second function unit.

4. The switch device according to claim 1, wherein
the function unit performs time synchronization with another function unit installed in the vehicle and belonging to the same VLAN as that of the function unit, by causing a message to include a propagation delay time of data between the function unit and the other function unit and transmitting the message, and
the calculation unit calculates the time correction information by using a transmission time and a reception time of the message.

5. The switch device according to claim 1, wherein
the relay unit performs a second relay process of relaying data between function units installed in the vehicle and belonging to the same VLAN,
the calculation unit creates second time correction information based on: propagation delay times of data between a third function unit and a fourth function unit serving as the function units belonging to the same VLAN, and the switch device; and a retention time of the data in the switch device, and
the notification unit notifies the fourth function unit of the second time correction information created by the calculation unit.

6. An on-vehicle communication device installed in a vehicle, the on-vehicle communication device comprising:
an acquisition unit configured to acquire, from a switch device configured to perform a first relay process of relaying data between the on-vehicle communication devices belonging to different VLANs, time correction information calculated on the basis of a transmission time of data from a first on-vehicle communication device serving as the on-vehicle communication device to the switch device, a reception time in the switch device of the data transmitted from the first on-vehicle communication device, a transmission time of data from a second on-vehicle communication device serving as the on-vehicle communication device to the switch device, and a reception time in the switch device of the data transmitted from the second on-vehicle communication device; and
a correction unit configured to correct time of the on-vehicle communication device to which the correction unit belongs, on the basis of the time correction information acquired by the acquisition unit.

7. An on-vehicle communication system comprising:
a switch device configured to perform a first relay process of relaying data between on-vehicle communication devices installed in a vehicle and belonging to different VLANs; and
the on-vehicle communication devices, wherein
the switch device calculates time correction information on the basis of a transmission time of data from a first on-vehicle communication device serving as the on-vehicle communication device to the switch device, a reception time in the switch device of the data transmitted from the first on-vehicle communication device, a transmission time of data from a second on-vehicle communication device serving as the on-vehicle communication device to the switch device, and a reception time in the switch device of the data transmitted from the second on-vehicle communication device, and the switch device transmits the calculated time correction information to the second on-vehicle communication device, and the second on-vehicle communication device receives the time correction information transmitted from the switch device, and corrects time of the second on-vehicle communication device, on the basis of the received time correction information.

8. A time correction method to be performed in a switch device configured to relay data between function units installed in a vehicle and belonging to different VLANs, the time correction method comprising the steps of:

calculating time correction information on the basis of a transmission time of data from a first function unit serving as the function unit to the switch device, a reception time in the switch device of the data transmitted from the first function unit, a transmission time of data from a second function unit serving as the function unit to the switch device, and a reception time in the switch device of the data transmitted from the second function unit; and notifying the second function unit of the calculated time correction information.

9. A time correction method to be performed in an on-vehicle communication device installed in a vehicle, the time correction method comprising the steps of:

acquiring, from a switch device configured to perform a first relay process of relaying data between the on-vehicle communication devices belonging to different VLANs, time correction information calculated on the basis of a transmission time of data from a first on-vehicle communication device serving as the on-vehicle communication device to the switch device, a reception time in the switch device of the data transmitted from the first on-vehicle communication device, a transmission time of data from a second on-vehicle communication device serving as the on-vehicle communication device to the switch device, and a reception time in the switch device of the data transmitted from the second on-vehicle communication device; and correcting time of the on-vehicle communication device on the basis of the acquired time correction information.

10. A time correction method to be performed in an on-vehicle communication system, the on-vehicle communication system including
a switch device configured to perform a first relay process of relaying data between on-vehicle communication devices installed in a vehicle and belonging to different VLANs, and
the on-vehicle communication devices, the time correction method comprising the steps of:

calculating, performed by the switch device, time correction information on the basis of a transmission time of data from a first on-vehicle communication device serving as the on-vehicle communication device to the switch device, a reception time in the switch device of the data transmitted from the first on-vehicle communication device, a transmission time of data from a second on-vehicle communication device serving as the on-vehicle communication device to the switch device, and a reception time in the switch device of the data transmitted from the second on-vehicle communication device;

transmitting, performed by the switch device, the calculated time correction information to the second on-vehicle communication device; and receiving, performed by the second on-vehicle communication device, the time correction information transmitted from the switch device and correcting, performed by the second on-vehicle communication device, time of the second on-vehicle communication device on the basis of the received time correction information.

* * * * *